United States Patent [19]

Cummins

[11] 3,924,464
[45] Dec. 9, 1975

[54] ATMOSPHERIC PRESSURE RATE OF CHANGE INDICATOR
[75] Inventor: Richard D. Cummins, Hamburg, N.Y.
[73] Assignee: Carleton Controls Corporation, East Aurora, N.Y.
[22] Filed: Feb. 28, 1974
[21] Appl. No.: 446,691

[52] U.S. Cl. .............................................. 73/170 R
[51] Int. Cl.² ......................................... G01W 1/00
[58] Field of Search .......... 73/170 R, 179, 384, 386, 73/387

[56] References Cited
UNITED STATES PATENTS

| | | | |
|---|---|---|---|
| 2,147,108 | 2/1939 | Rysky | 73/179 |
| 2,159,703 | 5/1939 | Koch | 73/179 |
| 2,162,308 | 6/1939 | Jenny | 73/179 |

*Primary Examiner*—Donald O. Woodiel
*Attorney, Agent, or Firm*—Sommer & Sommer

[57] ABSTRACT

An atmospheric pressure rate of change indicator includes a compartment for containing a volume of air, a restricted orifice for effecting communication between the compartment and the atmosphere, a flexible diaphragm operatively associated with the compartment for sensing compartment pressure on one side of the diaphragm and atmospheric pressure on the other side thereof, and an indicator coupled to the flexible diaphragm to display the rate of change of atmospheric pressure as a function of diaphragm deflection. The restricted orifice permits pressure within the compartment to equalize with atmospheric pressure over a period of time so that the rate of change in atmospheric pressure can be sensed and indicated. Pressure within the compartment is unaffected by changes in ambient temperature. A seondary dampening orifice may be provided to shield the diaphragm from rapid fluctuations in atmospheric pressure.

5 Claims, 7 Drawing Figures

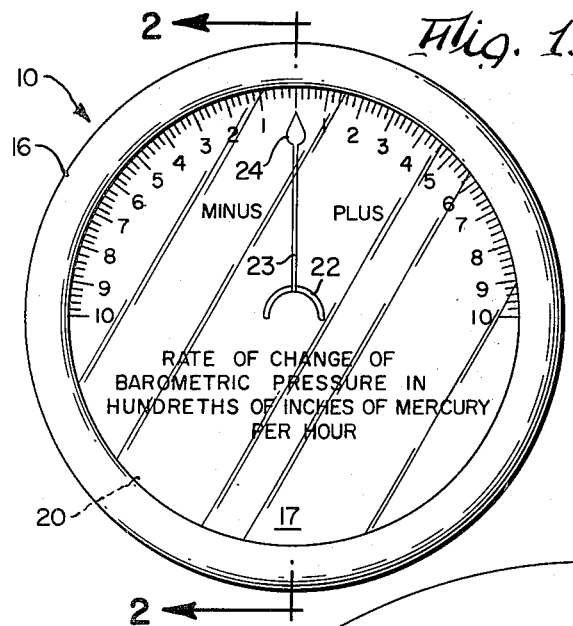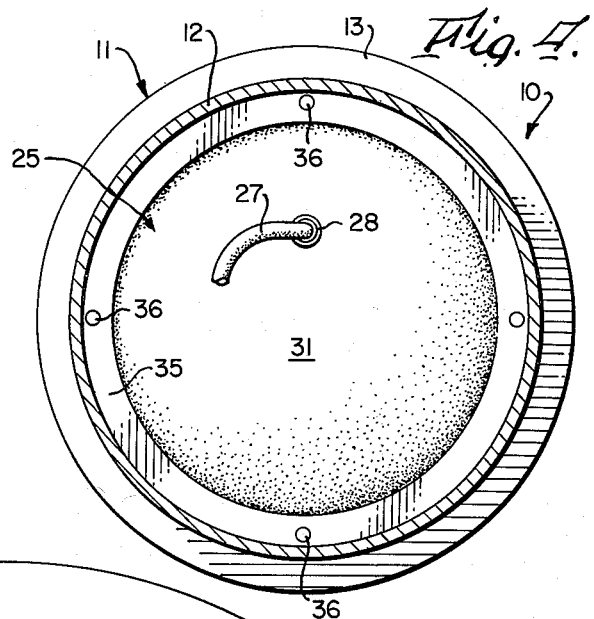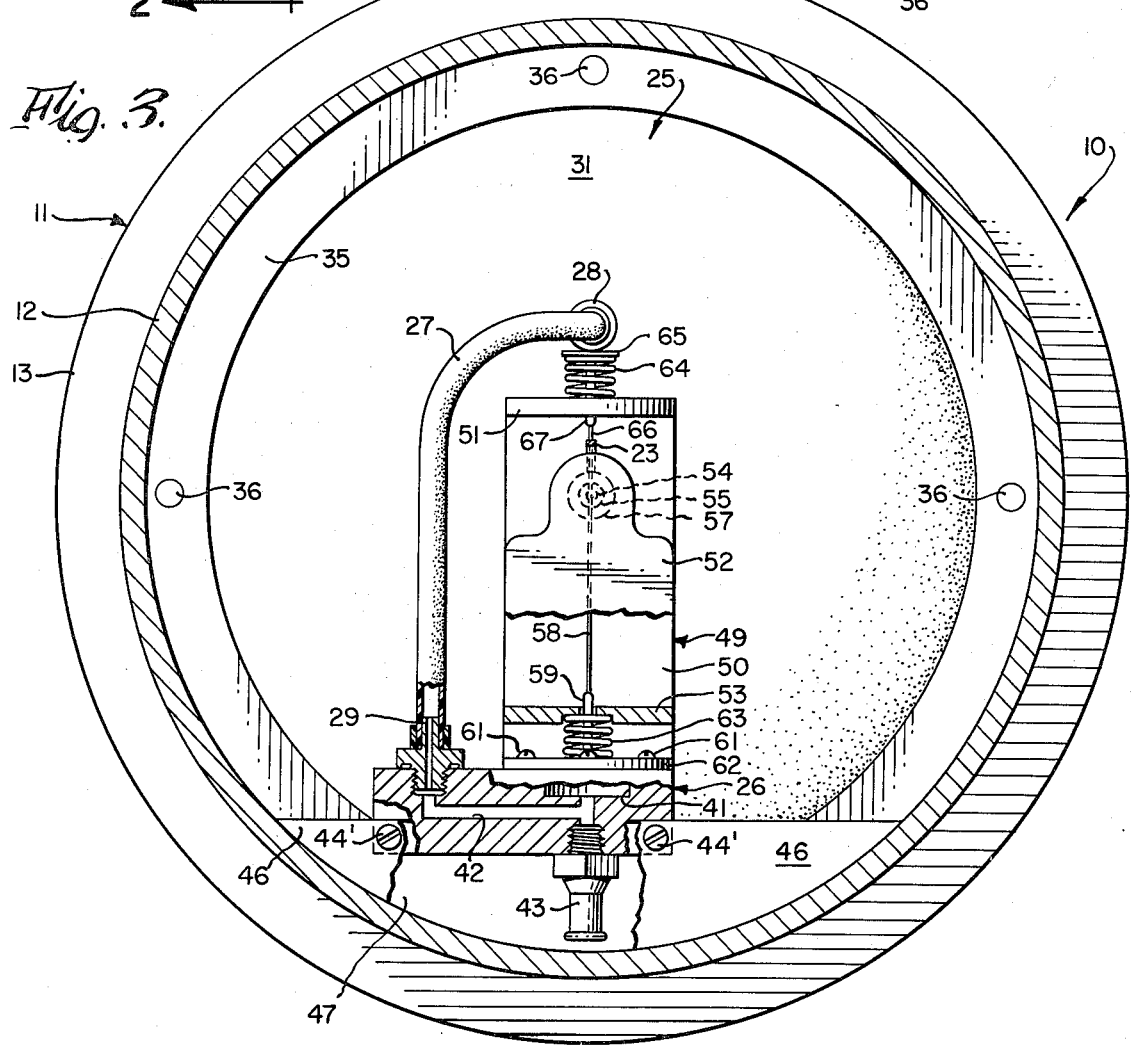

ATMOSPHERIC PRESSURE RATE OF CHANGE INDICATOR

BACKGROUND OF THE INVENTION

Various instruments are used to sense, measure, and report our environmental parameters, such as atmospheric pressure, temperature, relative humidity, and the like. In the hands of a skilled meteorologist, the raw data provided by these instruments may form the basis for predicting future weather.

Atmospheric pressure is a most important factor in predicting weather. It is known that a high pressure air mass will flow toward a low pressure air mass and that such movement is related to wind velocity and direction, temperature changes, and the various forms of precipitation.

The rate of change of atmospheric pressure is a most significant weather indicator, particularly in predicting the imminence of severe storms.

SUMMARY OF THE INVENTION

The atmospheric pressure rate of change indicator of the present invention comprises compartment means providing an air chamber and including movable wall means exposed on one side to the pressure of air in said chamber and exposed on the other side to atmospheric pressure, restricted orifice means establishing communication between the chamber and the atmosphere, and indicator means operatively associated with the wall means and responsive to movement thereof to indicate the rate of change of atmospheric pressure. This indicated rate of change is responsive to the deflection of the movable wall means and proportional to the differential of pressures exerted on the opposite faces thereof. While the pressure within the air chamber seeks equalization with the atmospheric pressure, a time lag is provided because the air is constrained to flow at a predetermined rate through the restricted orifice means in relation to the magnitude of the differential pressure thereacross. If the atmospheric pressure changes at a rate faster than the restricted orifice means permits the pressure within the air chamber to equalize with atmospheric pressure, the indicator means will deflect and, by calibration, a specific reading of rate of change of atmospheric pressure can be observed. If the atmospheric pressure change rate is variable, the indicator means will continue to change its rate indication. If such rate is constant, the indicator means will steady to give a constant rate indication. Of course, when atmospheric pressure ceases to change and becomes static, the restricted orifice means will permit equalization of pressure between the air chamber and the atmosphere after a period of time, following which the indicator means will return to a null or neutral position. The compartment means noted above which provides an air chamber is constructed in such a manner that its volume will vary directly with changes in temperature to maintain the pressure of air within the chamber substantially constant under all atmospheric temperature conditions, so that temperature changes will not affect the reference pressure within the compartment. The instrument may additionally be provided with dampening means, or dampening orifice means, such a restricted orifice, to shield or dampen immediate movement of the diaphragm from rapid fluctuations in atmospheric pressure.

Accordingly, one object of the present invention is to provide a meteorological instrument capable of sensing and indicating the rate of change of atmospheric pressure.

Another object is to provide a rate of change barometer which is insensitive to temperature variations.

Another object is to provide a meteorological instrument capable of accurately sensing and reporting an environmental parameter.

These and other objects and advantages will become apparent to persons skilled in this art from the foregoing and on going specifications, which includes the drawings and the appended claims.

BRIEF DESCRIPTION OF THE DRAWINGS

FIG. 1 is a front elevational view looking at the faae of one form of the rate of change indicator constructed in accordance with the principles of the present invention;

FIG. 3 is a fragmentary vertical sectional view thereof taken substantially along line 3—3 of FIG. 2;

FIG. 4 is a reduced vertical sectional view thereof taken substantially along line 4—4 of FIG. 2;

DETAILED DESCRIPTION OF THE PREFERRED EMBODIMENT (S)

Figure 2:
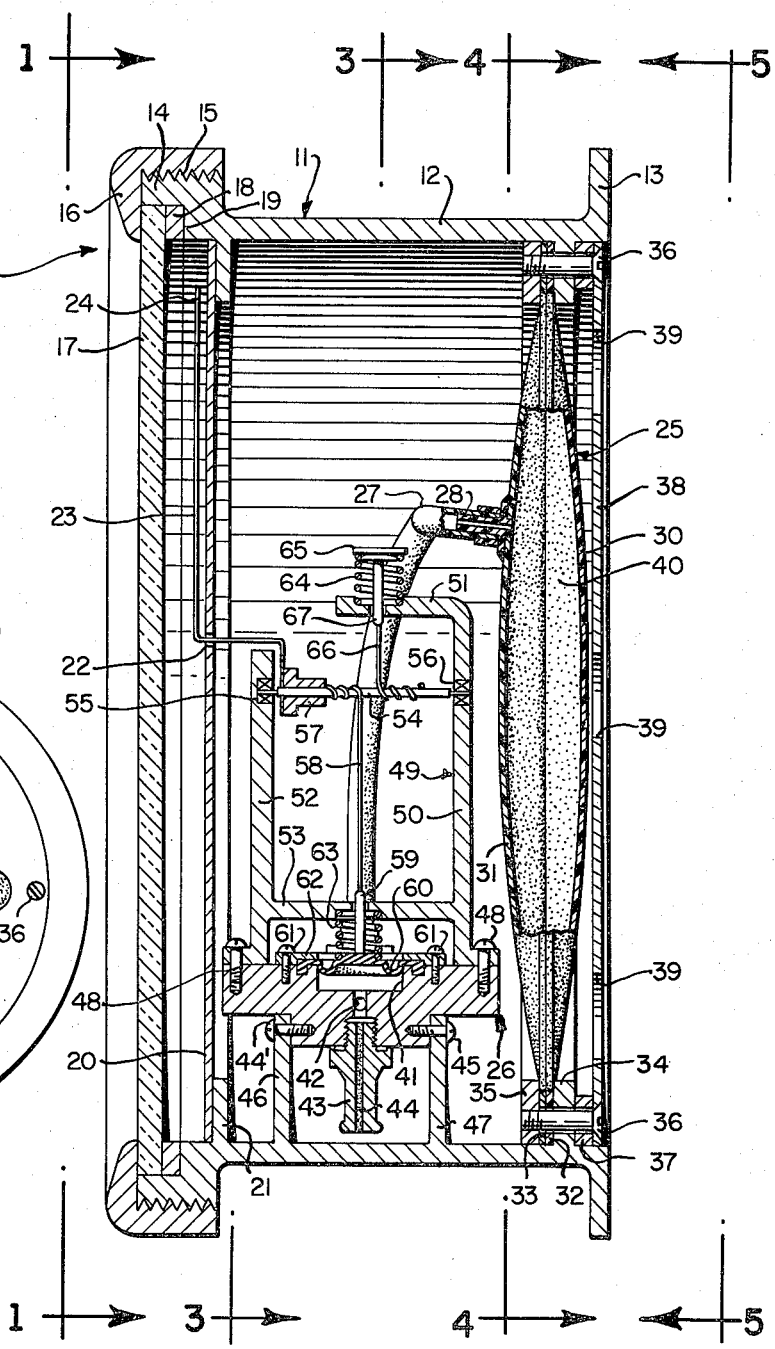
FIG. 2 is an enlarged vertical central sectional view thereof taken substantially along line 2—2 of FIG. 1.

In the drawings, like reference numerals indicate particular structure throughout and corresponding to the elements and structure described in this specification, unless otherwise stated.

Referring to FIGS. 1 and 2, the atmospheric pressure rate of change indicator 10 of the present invention includes a housing 11 having a substantially cylindrical central portion 12 and provided with an annular flange 13 on the rear portion thereof and an annular flange 14 proximate the front thereof. Flange 14 is shown exteriorly threaded at 15 to receive an annular bezel 16 in threaded mating relationship for holding a circular glass cover 17 is position against an annular washer 18 which is pressed against an annular shoulder 19. A circular scale plate 20 is secured to annular rim 21 which forms an internal part of housing 11. Scale 20 includes a generally semicircular slot 22 through which pointer 23 extends for deflection along the arcuate path.

As best shown in FIG. 1, the free end 24 of pointer needle 23 points to the graduations on the face of the scale 20, which graduations represent increments of the rate of change of atmospheric pressure per unit of time. As illustrated, the larger numbered graduations correspond to hundredths of an inch of mercury per hour (0.01 inch Hg/hr), and the smaller subdividing graduations represent increments of two one-thousandths of an inch of mercury per hour (0.002 inch Hg/hr). When needle 23 points at zero, a stable barometric condition exists, that is, there is no change in atmospheric pressure. If it swings in a counter-clockwise direction from the position shown in FIG. 1, it will provide a minus reading and indicate the rate of change at which the atmospheric pressure is falling. If it swings in a clockwise direction from the zero position, it will show the rate of change at which such pressure is rising. In accordance with generally accepted interpretations of such meteorological information, a fall of 0.09 inches per hour could suggest the approach of a hurricane, a very intense and rapidly moving storm, or a rapidly developing storm which might typically be accompanied by heavy precipitation and strong winds. A barometric pressure drop of 0.03 inches per hour could signify approach of a less intense storm accompanied by winds and precipitation with a fairly wide range of intensity and followed by clearing and colder weather. Smaller changes at the rate of 0.01 inches per hour might generally be considered transient and not indicate the approach of any immediate severe weather. On the other hand, a large pressure rise, indicated by clockwise movement of needle 23 to the plus side of the scale, would generally follow passage of major storms or hurricanes and be accompanied by decreasing levels of wind and precipitation.

In order to obtain the rate of change reading discussed above, the rate of change indicator 10 comprises compartment means arranged within the instrument and including a first relatively large compartment 25 and a second relatively small compartment 26, said compartments being in communication with each other through conduit 27. This conduit has one end mounted on nipple 28 in communication with the first compartment 25 and its other end mounted on nipple 29 in communication with the second compartment 26. The first compartment 25 may be fabricated by assembling domed halves 30 and 31 to have their marginal annular lip portions 32 and 33, respectively, superimposed and clamped together in sealing relationship between an internal annular rim 34 formed integrally with housing 11 and an annular ring 35. Rim 34 and ring 35 may be selectively drawn together to compressively clamp the marginal annular lip portions into fluid-tight sealed relationship by suitably tightening screws 36 which have their head portions arranged to bear against rear plate 38, their threaded end portions received in tapped apertures (not numbered) provided in rim 34, and their intermediate shank portions passed through aligned holes in rim 35 (FIG. 4) and annular ring 37. The rear plate 38 is shown provided with a plurality of openings or apertures 39 therethrough to permit atmospheric pressure to communicate with the inside of housing 11.

As best shown in FIG. 2, compartment 25 includes a chamber 40 which contains air and communicates with chamber 41 of compartment 26 through the above-mentioned conduit 27 and a conduit 42 (FIG. 3) extending through compartment 26. The air chamber therefore consists of chambers 40 and 41 and conduits 27 and 42. A nipple 43 is threaded into the wall of compartment 26 and includes a restricted orifice 44 which permits flow of air from chambers 41 and 40 to the atmosphere in the event that the pressure in chamber 41 is greater than atmospheric pressure, and also permits flow of atmospheric air into chambers 41 and 40 in the event that the atmospheric pressure is greater than the pressure in chamber 41. To provide the necessary degree of restriction, orifice 44 may be packed with a porous material, such as ceramic powder or compacted glass fibers.

As best shown in FIGS. 2 and 3, compartment 26 is secured to spaced walls 46 and 47 formed integrally with housing 11 by screws 44' and 45 and forms part of the base structure which supports needle 23. Compartment 26 mounts, on its upper end by means of screws 48, a structure 49 which constitutes the remainder of the base and includes a rear vertical leg portion 50 having a forwardly projecting horizontal upper shelf 51 at its upper end, and an upstanding front vertical leg portion 52, the spaced vertical leg portions 50 and 52 being connected by a raised horizontal lower shelf 53. A horizontal shaft 54 has its opposite ends mounted in jewel or other suitable low-friction bearings 55 and 56 which are mounted in legs 52 and 50, respectively. A collar 57 fixedly secures one end of pointer 23 to shaft 54 for rotation therewith. A flexible connector 58, such as a cord, string, hair, or wire, has one end suitably secured to shaft 54 and the other end suitably secured to vertical pin 59 which is in turn suitably secured to movable wall means shown as a generally horizontal flexible diaphragm or movable wall 60 forming a part of compartment 26.

Flexible diaphragm 60 is secured in sealed relationship to compartment 26 by means of plurality of circumferentially spaced screws 61 which extend through annular ring 62 which presses against the outer marginal lip of diaphragm 60. A helical spring 63 is interposed between the underside of shelf 53 and the top of diaphragm 60 in surrounding relationship to pin 59 so as to bias diaphragm 60 downwardly and thus tend to tension flexible connector 58. A second helical spring 64 is interposed between the upper side of shelf 51 and head 65 attached to the upper end of a pin 67 the lower end of which is attached to a flexible connector 66, such as a cord, string, hair, or wire. The lower end of connector 66 is wound around and suitably secured to shaft 54, as shown in FIGS. 2 and 3. Springs 64 and 63 have substantially the same spring rate and apply opposing rotational forces to shaft 54. In this manner, the forces exerted by the springs oppose and cancel each other when there is no differential pressure across diaphragm 60, but maintain the flexible connectors 58 and 66 in tension so that there is no play in the connection between pointer 23 to diaphragm 60. If diaphragm 60 moves upwardly, lower spring 63 will be compressed and upper spring 64 will be permitted to expand. On the other hand, if diaphragm 60 moves downwardly, lower spring 63 will expand and upper spring 64 will be compressed. The effect of this motion is to wrap and unwrap flexible connectors 58 and 66 around shaft 54 and thereby rotate this shaft to move pointer 23. Thus, shaft 54 is coupled to diaphragm 60 by pushpull connection means.

Compartment 25 may be constructed of any suitable rigid or semi-rigid material having characteristics of thermal expansion capable of varying the volume of the compartment means proportionally with the air contained therein to provide a degree of volumetric rigidity and immunity from temperature variations. While compartment 25 may be formed in any suitable shape so as to provide an internal chamber to contain a trapped volume of air therewithin, it is presently preferred to use, as the material of construction, a low density or high expansion rate polyethylene having a coefficient of thermal expansion of about $15 \times 10^{-5}$ inches of elongation per inch of length per Fahrenheit degree of temperature change. The domed portions of compartment halves 30 and 31 may be about 4.5 inches in diameter, have a maximum height of about 0.635 inch from their common chordal plane, and a wall thickness of about 0.06 inch. In general, the diameter of the domed portions should be at least 20 times their individual wall thickness. The spherically segmented shape of the domed portions is preferred because it provides inherent rigidity and volumetric adjustment because of change in its arcuate length in relation to its height. A flatter dome will provide a greater change in height than a change in arc length and hence, more volumetric amplification. In designing the spherical dome halves, the change in volume of the plastic envelope in relation to the change in volume of the air trapped therein due to constant pressure temperature variation is to be maintained. This objective permits the spherical radius to be calculated according to the coefficient of thermal expansion of the particular material of construction, thereby to provide a compartment which will be relatively insensitive to temperature variations.

In order to further maintain a pressure in chamber 40 insensitive to temperature variations, the compartment means, consisting of compartments 25 and 26 and conduits 27 and 42, should be sufficiently rigid so as not to have their collective volume changed by variations in atmospheric pressure. As noted above, walls 30 and 31 are preferably formed as spherical segments to provide the desired degree of rigidity and also to permit variation in arcuate length, and hence, it height above the chordal plane including the joint between lip portions 32 and 33. However, it will be appreciated that compartment 25 can assume other shapes which are capable of achieving the foregoing results.

The first restricted orifice 44 in nipple 43 permits communication between chamber 41 and the atmosphere and may be packed with a flow-restricting porous material to provide a time lag between equalization of pressure within the compartment means and the atmosphere, such time lag permitting a rate of change reading on the face of the instrument. In the event there is a rapid atmospheric pressure drop, the pressure within chamber 41 will be higher than the ambient pressure. This will cause diaphragm 60 to flex upwardly and deflect needle 23 to the left, or in a counterclockwise direction as viewed in FIG. 1, until a force balance is reached when the downward force on diaphragm 60 due to the pressure of the atmosphere plus the net downward force of the now compressed spring 63 and expanded spring 64, equals the upward force exerted on the diaphragm by the pressure in chamber 41. Of course, the pressure in chamber 41 is simultaneously dropping due to controlled bleeding of air from this chamber through restricted orifice 44. A time may come when the rate of change of the differential pressures acting on diaphragm 60 will become constant, in which case the pointer 23 will come to rest in a displaced condition. This signifies that the atmospheric pressure above diaphragm 60 is dropping at the same rate as the pressure within chamber 41 is dropping due to outflow of air therefrom through restricted orifice 44. Should the atmospheric pressure drop faster than the pressure in chamber 41, the pointer will continue to move leftwardly as viewed from the front of the instrument. Conversely, when the atmospheric pressure drops more slowly than the pressure in chamber 41, the pointer 23 will move rightwardly toward the null or neutral position, indicating a decrease in the rate by which the atmospheric pressure is falling. A period of time after the atmospheric pressure becomes static, the pressure within chamber 41 will equalize with it, causing the pointer to return to its null or neutral position shown in FIG. 1.

Deflections of pointer 23 relative to its null or neutral position similar to those described above but to the right or on the plus side, viewing the instrument from the front, will occur when atmospheric pressure is increasing rather than decreasing. However, when the atmospheric pressure is greater than the pressure within chamber 41, air will flow into this chamber through restricted orifice 44, the porous packing again providing the necessary time lag.

It will be appreciated that if the orifice 44 is further restricted so as to provide a slower flow of air therethrough, the time lag will be longer and hence the instrument will be less sensitive to the actual rate of change of atmospheric pressure. If the orifice 44 is less restricted to permit an increased air flow therethrough, the time lag will be shorter and the instrument will be more sensitive to the actual parameter being measured. In an actual embodiment of this device, the orifice 44 was restricted to permit passage of 1.09 standard cubic centimeters of air per minute per pound per square inch of differential pressure across the orifice, i.e., between the pressure in chamber 41 and the atmosphere.

Depending upon the degree of sensitivity desired, the instrument may additionally be provided with dampening means which functions to shield the diaphragm from rapid fluctuations in atmospheric pressure. Provision of such dampening means actually serves to decrease the sensitivity of the instrument by making it respond to long term variations in atmospheric pressure.

Figure 6:
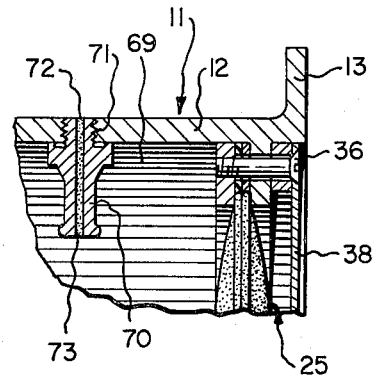
FIG. 6 is a fragmentary vertical sectional view of a modified form of the instrument housing, generally similar to the upper right hand corner portion of the device depicted in FIG. 2, and showing the additional provision of dampening means to shield the diaphragm from rapid fluctuations in atmospheric pressure.
Figure 5:
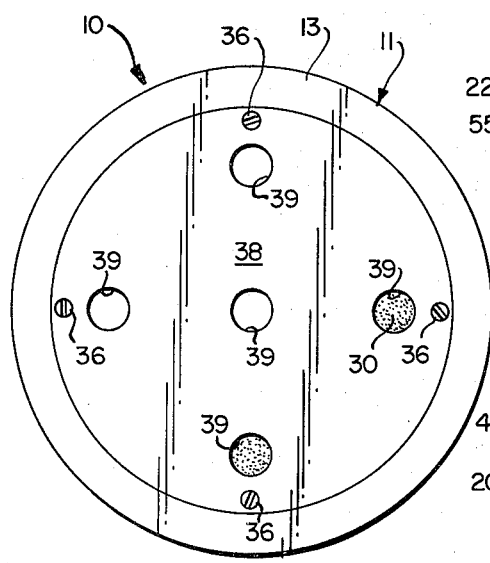
FIG. 5 is a reduced rear side elevational view thereof taken in the direction of arrows 5—5 of FIG. 2.

As best shown in FIG. 6, a modified embodiment of the instrument may be provided with a solid rear plate 38a, generally corresponding to rear plate 38 in FIG. 2 but without the provision of apertures 39. Hence, in this embodiment, the chamber 69 within the housing will be sealed from variations in atmospheric pressure. The dampening means may include a nipple 70 arranged within the housing and threaded into a tapped holed 71 provided through the central portion 12 thereof. The internal flow conduit 72 of nipple 70 is arranged to communicate the chamber within the housing with the atmosphere. This flow conduit 72 may be packed with a porous material, such as ceramic powder or compacted glass fibers, to provide a dampening restricted orifice 73 to permit the pressure within the housing to equalize with atmospheric pressure after a period of time. A rapid rise in atmospheric pressure will be slowly admitted into chamber 69 through restricted orifice 73 to act on the upper surface of diaphragm 60. Conversely, if the atmospheric pressure were to fall rapidly, the pressure in chamber 69 would be permitted to bleed slowly to exhaust. Accordingly, provision of the dampening means, such as dampening restricted orifice 73, serves to shield the diaphragm from rapid fluctuations in atmospheric pressure.

Figure 7:
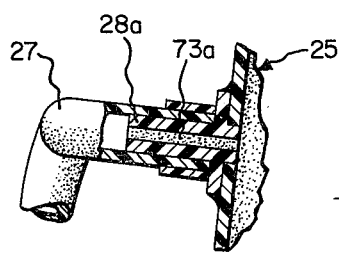
FIG. 7 is an enlarged fragmentary detail view, partly in section and partly in elevation, of a modified form of nipple 28, generally similar to the nipple in association with the large compartment illustrated in FIG. 2, and showing the modified nipple as including a restricted orifice to dampen movement of the diaphragm in response to rapid fluctuations in atmospheric pressure.

A second modified embodiment, illustrated in FIG. 7, utilizes second restricted orifice means to shield the diaphragm from rapid fluctuations in atmospheric pressure. In this embodiment, nipple 28a, generally corresponding to nipple 28 in FIG. 2, is packed with a porous material, such as ceramic powder or compacted glass fibers, to provide a restricted orifice 73a in the conduit means. Hence, if atmospheric pressure were to fall rapidly, restricted orifice 73a would provide an impediment to flow of air between chambers 40 and 41, thereby decreasing immediate movement of the diaphragm by exposing its lower surface to a relatively small amount of relatively pressurized air in chamber 41. Conversely, if atmospheric pressure were to rise rapidly, immediate downward deflection of the diaphragm would be dampened by compression of the relatively small amount of air in chamber 41.

While a preferred embodiment of the invention has been shown and described, it will be understood by a person having ordinary skill in this art that various changes and modifications may be made without departing from the spirit of the invention which is defined by the following claims.

What is claimed is:

1. An atmospheric pressure rate of change indicator, comprising:
   a sealed housing having a chamber therewithin and provided with an opening therethrough communicating said housing chamber with the atmosphere;
   dampening orifice means operatively arranged in said housing opening and adapted to permit pressure of air within said housing chamber to equalize with atmospheric pressure after a period of time;
   compartment means arranged within said housing chamber, said compartment means providing an air chamber therewithin and including movable wall means exposed on one side to the pressure of air in said compartment chamber and exposed on its other side to the pressure of air in said housing chamber;
   first restricted orifice means establishing communication between said compartment and housing chambers for permitting the pressure of air in said compartment chamber to equalize with the pressure of air in said housing chamber after a period of time; and
   indicator means operatively associated with said movable wall means and responsive to movement thereof for indicating the rate of change of atmospheric pressure, whereby said dampening orifice means may shield said movable wall means from rapid fluctuations in atmospheric pressure.

2. An atomspheric pressure rate of change indicator as set forth in claim 1 wherein said compartment means comprises a relatively large first compartment, a relatively small second compartment, and conduit means establishing communication between said first and second compartments; and wherein said first restricted orifice means is arranged in said second compartment and said movable wall means comprises a flexible diaphragm forming a wall of said second compartment.

3. An atmospheric pressure rate of change indicator as set forth in claim 2 wherein the enclosing wall of said first compartment is fabricated from a material suitable to vary the volume within said first compartment directly with changes in temperature, whereby the volume within said compartment means may remain substantially unaffected by changes in ambient temperature.

4. An atmospheric pressure rate of change indicator as set forth in claim 2 and further comprising a supporting base, a shaft, bearing means rotatably mounting said shaft on said base in spaced relation to said flexible diaphragm, and push-pull connection means coupling said flexible diaphragm to said shaft; and wherein said indicator means comprises a pointer secured to said shaft.

5. An atmospheric pressure rate of change indicator as set forth in claim 14 and further comprising a second restricted orifice means operatively arranged in said conduit means for permitting the pressures in said first and second compartments to equalize after a period of time, whereby said second restricted orifice means may dampen the effect of rapid fluctuations of pressure within said housing chamber on said first compartment.

* * * * *